United States Patent [19]

Samson

[11] Patent Number: 4,729,171

[45] Date of Patent: Mar. 8, 1988

[54] MEASURING TAPE

[76] Inventor: Ilan Samson, 62, Eshkol Street, Tel Aviv, Israel

[21] Appl. No.: 17,233

[22] Filed: Feb. 20, 1987

[30] Foreign Application Priority Data

Feb. 21, 1986 [GB] United Kingdom ............... 8604377

[51] Int. Cl.$^4$ .............................................. G01B 3/10
[52] U.S. Cl. ......................................... 33/138; 33/668
[58] Field of Search ................ 33/138, 139, 140, 189, 33/668

[56] References Cited

U.S. PATENT DOCUMENTS

| 3,262,211 | 7/1966 | Beckett . |
| 3,731,389 | 6/1973 | King . |
| 3,802,083 | 4/1974 | Freed . |
| 4,015,337 | 5/1977 | Taylor . |
| 4,296,554 | 10/1981 | Hammerstrom . |
| 4,439,927 | 4/1984 | Elliott ............... 33/138 X |
| 4,542,589 | 9/1985 | Yamamoto . |
| 4,551,847 | 5/1985 | Caldwell . |
| 4,630,376 | 12/1986 | Pentecost ............... 33/138 |

FOREIGN PATENT DOCUMENTS 1601480 10/1981 United Kingdom .

Primary Examiner—Harry N. Haroian
Attorney, Agent, or Firm—Abelman Frayne Rezac & Schwab

[57] ABSTRACT

A tape measure case incorporates an actuating element to project a marking element through a guide aperture for marking at a measured distance. The marking element can be a pencil lead. It is accommodated within the case, and the bulk and shape of the case are little changed from conventional.

17 Claims, 8 Drawing Figures

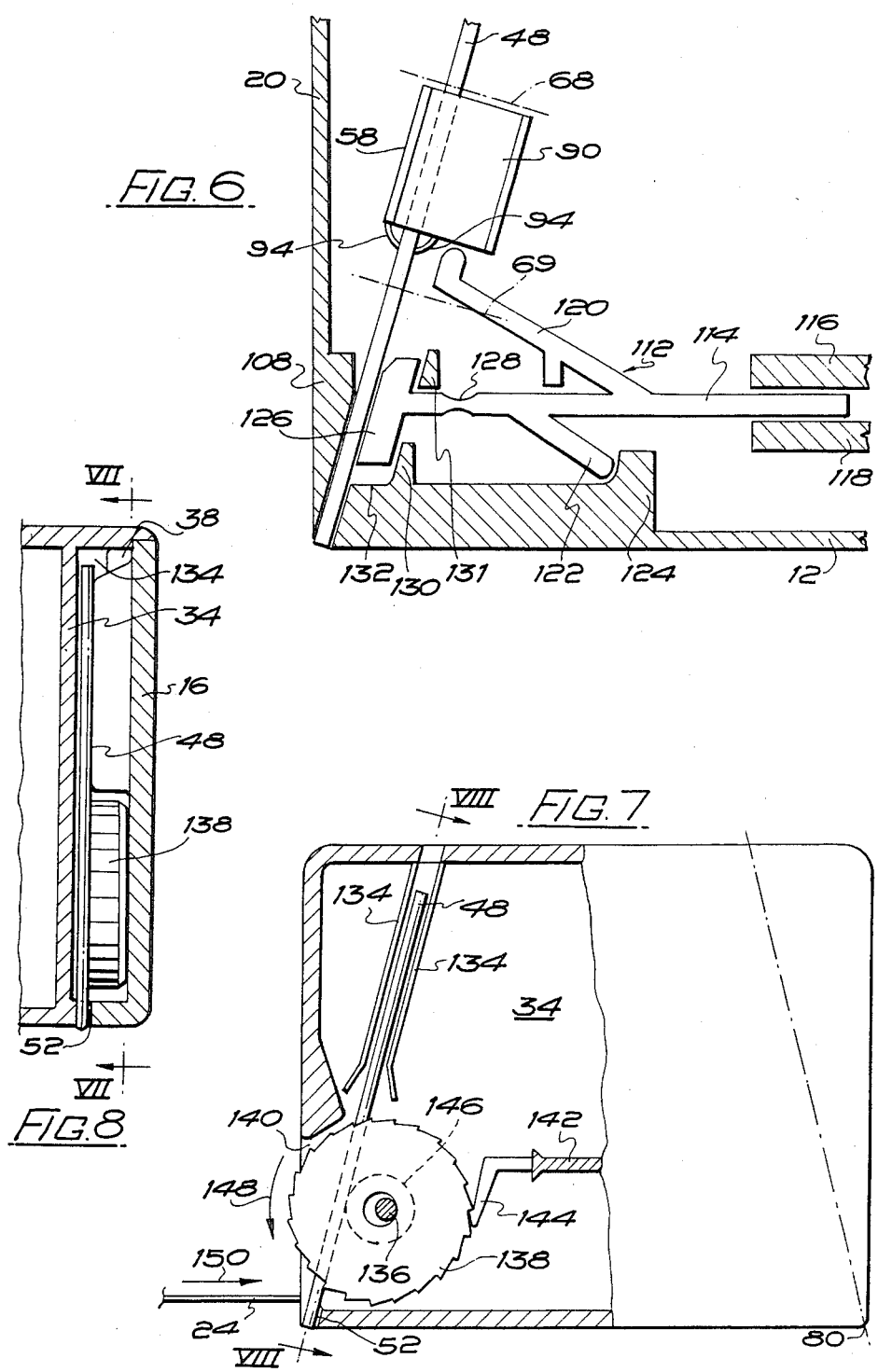

MEASURING TAPE

FIELD AND BACKGROUND OF THE INVENTION

This invention relates to a measuring tape of the kind having a case with a measuring tape bearing distance markings which is coilable within the case and extensible from the case through a mouth in the case walls.

It is known for tape measures to be provided with means for making a mark at a measured position. Generally, prior proposals have tried to add a pencil or pen in some way which considerably enlarges the overall size of the tape measure, and/or provide projections which can snag if the tape measure is placed in a pocket, and-/or provide a mark at some place other than the mouth of the case, and/or fail to provide a system which is convenient to use.

Examples of prior proposals are U.S. Pat. Nos. 3.262,211, 3,731,389, 3,802,083, 4,015,337, 4,296,554, 4,542,589 and 4,551,847 and UK Pat. No. 1601480.

SUMMARY OF THE INVENTION

It is an object of the present invention to provide a tape measure with marking means in a manner which can avoid greatly enlarging the case, and does not necessitate awkward projections from the case.

It is also an object of the invention to provide a tape measure with marking means which are easy to use.

Further objects of the invention are economy in manufacture, and to make possible use of marking elements which are commercially available, so that they can be replaced readily and inexpensively.

In one aspect of the present invention a tape measure case is provided with an elongate marking element which is located within the case and has its end portion in an aperture through the case beside the tape and proximate the mouth of the case. An actuating element is provided within the case, engaging the marking element. It is operable by hand to advance the marking element so that a tip of this element projects from the aperture beside the tape. The actuating element is exposed through an opening in the case—and typically it projects through this opening—intermediately up the height of the sides of the case.

It is preferred that the actuating element engages the marking element in such a way that the tip of the marking element is retractable back into the aperture either manually or automatically. Thus, the actuating element may retract the marking element, or may permit it to be pushed back into the case. For automatic retraction the actuating element may advance the marking element against resilient bias which can then cause retraction of the marking element.

In a second aspect of this invention a tape measure case is provided with an elongate marking element at a position with the end portion of the marking element proximate the said mouth and beside said tape. An actuating element is provided, engaging the marking element and operable by hand against resilient bias to advance the marking element to cause a tip thereof to project, for making a mark. The resilient bias serves to return the actuating element and retract the projecting tip after use to make a mark. The actuating element is also operable to advance the marking element without equal retraction subsequently. This allows the marking element to be advanced permanently, e.g. to compensate for wearing down a pencil lead. The actuating element preferably engages the marking element intermediate between its end, and is exposed on a wall of the case such that manual operation of the actuating element is a manual operation alongside the case and alongside the marking element.

Preferably, to effect advance without equal retraction, the actuating element applies a clamp to the marking element which holds it against retraction.

Engaging an end portion of the marking element in an aperture beside the tape is advantageous, in that when the tip of the marking element projects, the aperture surrounds a penultimate portion of the marking element at the case periphery. This can support the tip of a thin marking element, reducing the risk of breakage. It can also promote accurate marking by locating the tip of the marking element.

The marking element may be a refill for a ball point or fibre tip pen, or may be a rigid scribing element. Preferred however is a pencil lead, such as is available for use in propelling pencils.

Preferably the marking element is no more than five mm thick, notably it may be a pencil lead which is at most one or two mm thick.

The case may have an elongate guide to receive the marking element, and the actuating element to advance the marking element may then advance it longitudinally along the guide. Preferably the actuating element serves to hold the marking element in position as well as serving to advance it. However, it is conceivable that some additional means could be provided to hold the marking element in place.

The walls of the case which extend between its base and upper surface will generally be a pair of side walls, spaced apart side by side and a pair of narrower edge walls, joining the side walls, with the tape being coilable around an axis transverse to the side walls.

The marking element may be accommodated in interior space within the case, or within the thickness of a case wall.

The marking element may extend alongside a side wall of the case, and generally parallel to that wall, inside the case. This case may be partitioned internally into a compartment for the tape and a second compartment for the marking element and actuating element.

Features of the invention enable use of slender marking elements, lacking rigidity and/or structural strength. By causing the marking element to project through a guide aperture, it is supported near its tip. Features of the invention also enable the basic size and shape of a tape measure case to be largely preserved. Consequently the tape measure can be as easy to carry, e.g. in a pocket in clothing, as existing tape measures lacking any marking element.

Most preferably the marking element, such as a pencil, pen, pin, stylus or the like, is retractable by means of a spring loading so that, at rest, the marking means is retracted automatically and is unobtrusive.

The aperture through which the tip of the marking element projects is preferably so located adjacent the mouth of the case that the marking point is in exact alignment with the edge of the mouth whereby a mark may be made exactly where the tape emerges.

Because of its accuracy a tape measure of the invention may be used for a variety of purposes including draughtsmanship. For this purpose the extremity of the tape may be provided with an upstanding indicator of the zero or other point. Measurements and marking may be made successively with a high degree of accuracy.

Preferably a second marking element projects adjacent an extremity of the case remote from its mouth. This can be useful if the tape measure is being used to measure close to an obstruction, preventing the tape from being extended sufficiently to place the first marking element in the desired position.

In order to explain the invention further, embodiments will now be described by way of example with reference to the accompanying diagrammatic drawings, in which:

FIG. 6 is a similar view to FIG. 4 showing a third embodiment;

FIG. 7 is a side view of a third embodiment sectioned on line VII—VII of FIG. 8; and FIG. 8 is a section on line VIII—VIII of FIG. 7.

Figure 1:
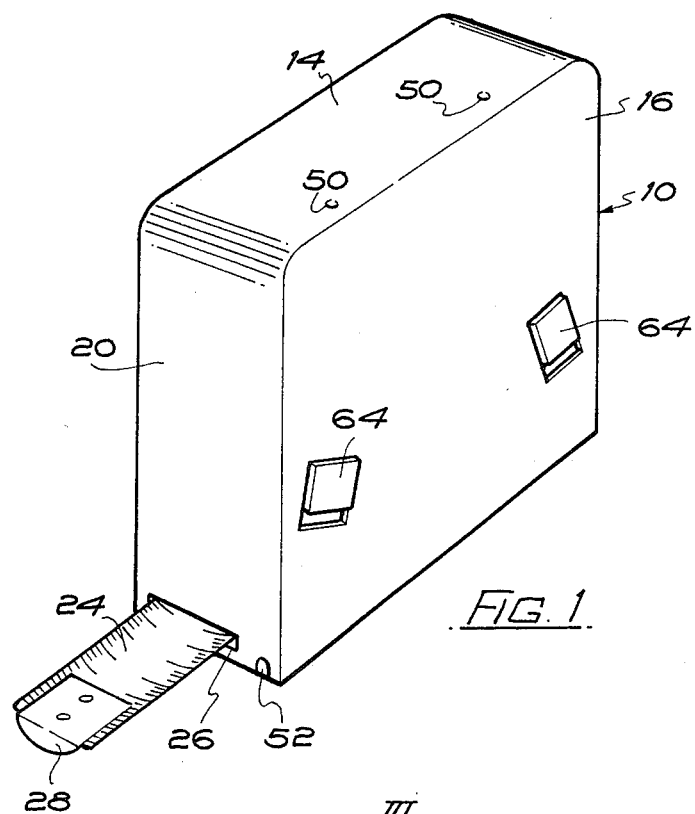
FIG. 1 is a perspective view of one embodiment of the invention.
Figure 2:
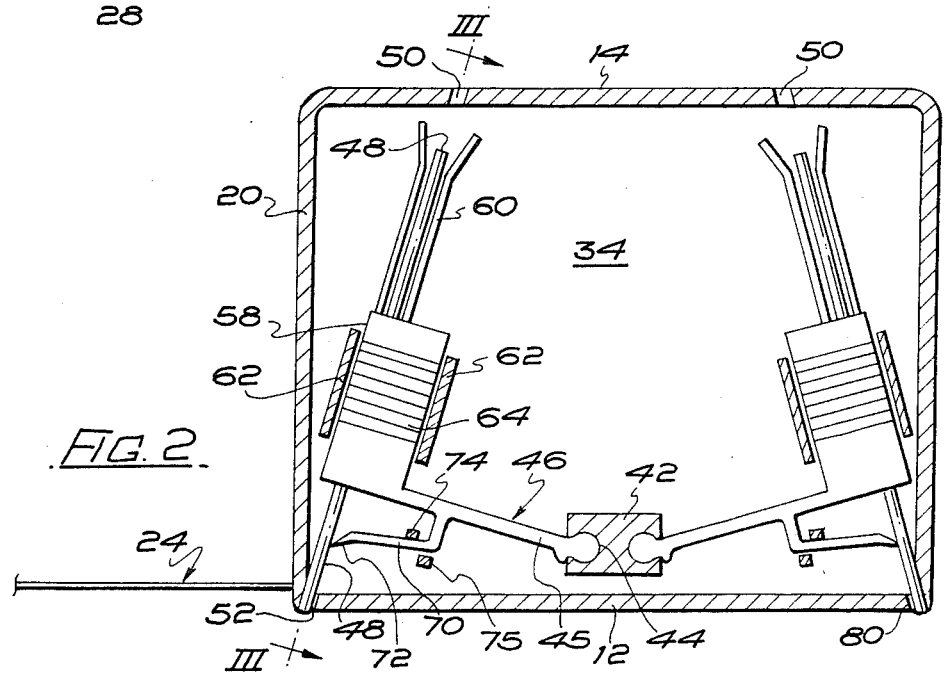
FIG. 2 is a side view of the embodiment of FIG. 1 sectioned on line II—II of FIG. 3.
Figure 3:
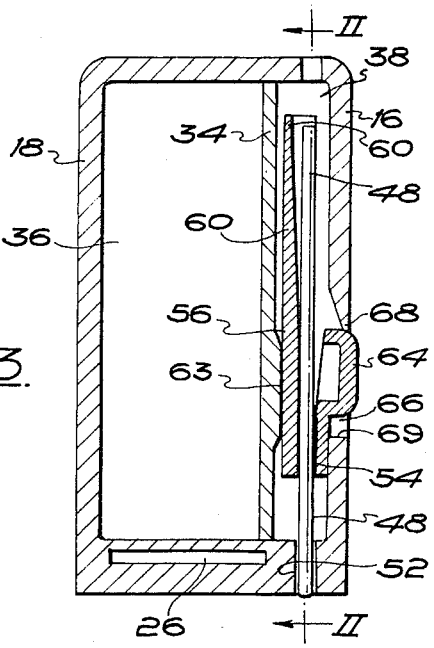
FIG. 3 is a section on line III—III of FIG. 2.

Referring first to FIGS. 1 to 3, the tape measure shown comprises a case 10 which is approximately a cuboid. It comprises a base wall 12 and upper wall 14 together with a pair of generally parallel side walls 16, 18 and edge walls 20, 22 extending between the walls 12, 14. The case 10 houses a coiled length of a tape 24 having distance markings. The case 10 has a mouth 26 through which the tape 24 can be drawn out for use. The tape 24 terminates, as is customary, at an end hook 28 which prevents it from being retracted too far. The mouth 26 is provided in edge wall 20, close to its junction with base wall 12.

The case 10 has an internal wall 34 parallel to the side walls 16, 18 dividing the case into a compartment 36 in which tape 24 coils around an axis extending between the walls 18, 34, and a second compartment 38. The tape is held coiled in the compartment 36, by means of a conventional mechanism supported between the walls 18, 34.

Within the compartment 38 a block 42 is provided, integral with wall 16. This block has a socket 44 into which is fitted one end of an arm 45 of a moulding 46 which is an actuating element which serves as means to hold and advance a pencil lead 48. This lead is initially inserted through a hole 50 in the top of the case, and its lower end portion is received in a guide aperture 52 aligned with the mouth 26. It will be seen that the lead 48 lies alongside and parallel to the interior of wall 16. The arm 45 is shaped so that it abuts the mouth of socket 44, and is substantially prevented from pivoting.

The moulding 46 has a slider constituted by an outer portion 54 and an inner portion 56 which are hinged together through a living hinge along their edge 58. These parts are moulded roughly coplanar and then the inner portion 56 is folded round behind the outer portion 54, forming a channel through which the lead 48 passes. A guide channel 60 for the lead extends up from the inner portion 56.

The slider 54, 56 is located between guides 62 which are integral with one or other of the walls 16, 34. The portion 54 includes a button 64 which projects through an opening 66 in the wall 16. This arrangement permits the slider portions 54, 56 to slide as one unit along the longitudinal direction of the pencil lead 48, over a short travel. The sliding resiliently bends the arm 45, which therefore exerts a restoring force on the slider 54, 56. This arm is arranged to hold the slider 54, 56 up so that the button 64 normally abuts or lies close to the upper boundary 68 of the opening 66.

The slider portions 54, 56 are normally far enough apart to allow the lead 48 to pass between them. Pressure on the button 64 pushes the portion 54 towards the portion 56, which itself is supported by a thickening 63 of the wall 34. The result is that the portions 54, 56 grip the lead 48 but only as long as pressure is applied to the button 64.

A thin leg 70 extends from the arm 45 to a pointed tip 72 as shown. This presses on the lead 48 at all times. Its tip 72 is arranged to apply slight pressure to the lead so that the lead 48 cannot fall freely past the tip 72, but can be pushed past it. Movement of the leg 70 is blocked by stops 74, 75 which project from one or other of the case walls 16, 34.

The rest condition is illustrated in FIGS. 2 and 3. If the button 64 is then pushed down towards the lower boundary 69 of the aperture 66, the finger pressure on the button 64 causes the portions 54, 56 to grip the lead, and the lead is advanced longitudinally until the button 64 reaches the boundary 69. The lead 48 advances past the tip 72, of leg 70, which then holds the lead 48 in the position it reaches. A mark is made while there is finger pressure on button 64. When the button 64 is released, the resilience of arm 45 returns portions 54, 56 without the lead 48.

The lead is initially slid in through the hole 50 and as far as possible down guide channel 60. The lead is then advanced by repeatedly pushing the button 64 down and releasing the button, until the tip of the lead appears from the guide aperture 52. After this, whenever it is desired to advance the lead, the button 64 is pushed down. The travel of the button 64 is restricted by the spacing of the boundaries 68, 69. These are set to restrict the travel to 2 mm. Consequently it is not possible to project the tip of the lead by more than 2 mm with a single operation of the button 64 which reduces the risk of projecting too much lead, and breaking it.

The lead will not retract automatically, but can be pushed in by hand when finished with.

An exactly similar lead and means to hold and advance it is provided in the other half of the compartment 38, for the lead to project through a guide aperture 80 at the corner of the case opposite to the mouth 26.

A modification (not illustrated) enables automatic retraction. The stop 75 is positioned 2 mm below the rest position of the leg 70. The boundary 69 of the aperture 66 is positioned to allow a longer travel, of say 4 mm.

When the button 64 is depressed, the leg 70 moves with the slider portions 54, 56 during the first 2 mm. If the button is released, the leg 70 moves up again with the slider 54, 56 and retracts the lead. After 2 mm the leg bears on the stop 75. More force is needed to depress the button further, until the button 64 abuts boundary 69. During this final travel the lead 48 is advanced past the leg, and this advance of the lead is not retracted when the button 64 is released.

Provision of three parallel walls 16, 18, 34 can be accomplished in various ways. The case 10 could be made of three moulded parts assembled with screws passing through all three, transverse to the walls 16, 18, 34. Alternatively the side wall 16 could snap fit onto a moulding providing the wall 34, or the internal wall 34 could snap fit into a moulding providing the wall 16.

Figure 4:
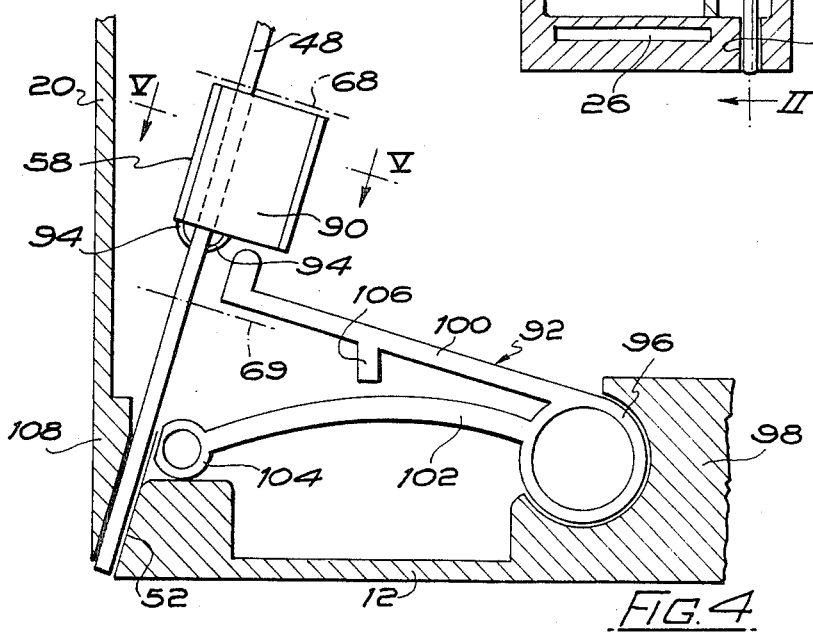
FIG. 4 is an enlarged view analogous to FIG. 2, showing a second embodiment.

FIG. 4 is an analogous view to FIG. 2, on a larger scale and showing a second embodiment. The case and external appearance are similar to that shown by FIG. 1. Like parts are shown with the same reference numerals. The case again has the walls 12-22, and an internal partition wall 34.

Figure 5:
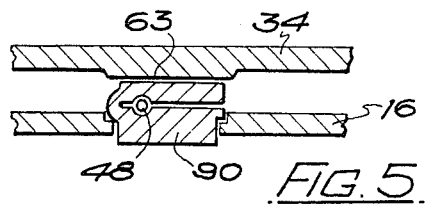
FIG. 5 is a section on line V—V of FIG. 4.

The embodiment of FIG. 4 has an actuating element 90 and a separate spring 92 providing resilient bias on the actuating element 90. The element 90 is again a slider, which is moulded from polypropylene. It has an outer portion and an inner portion. The two portions are hinged together along their edge 58, and are folded together defining a channel through which the lead 48 passes. The actuating element is shaped to fit into rebated side edges of the opening in the wall 16 of the case, and to project through the opening as shown in FIG. 5. Travel of the actuating element 90 is limited by abutment against the upper and lower boundaries 68, 69 of the opening in the case. These boundaries are indicated by chain dotted lines.

The dimensions are arranged such that the actuating element 90 normally grips the lead lightly, but is compressed onto the lead 48, to grip it more tightly, if finger pressure is applied to the part projecting through the opening in the case.

The spring 92 is moulded from polyacetal resin. It includes a large circle 96 engaged in a socket formed in a block 98 integral with case wall 16. This circle 96 is joined to a straight leg 100 and a normally curved leg 102 leading to a smaller circle 104. The spring is shown in its least stressed condition, urging the actuating element 90 against upper boundary 68.

To advance the lead 48 by about 2 mm, the actuating element is pushed down by hand, but not beyond the point at which the short leg 106 abuts the curved leg 102. When the leg 106 contacts leg 102, there is a noticeable increase in the opposing force. Finger pressure should be maintained while a mark is made. If the actuating element is then released the spring returns it, until it again contacts the upper boundary 68. The actuating element 90 lightly grips the lead, even after finger pressure is released and the lead is therefore retracted automatically as the element 90 is returned by the spring 92. The lower part of the actuating element 90 is provided with hooks 94 which grip the lead lightly and ensure that the lead retards with the actuating element.

The lead 48 can be indexed forward (i.e. advanced further than it is subsequently retracted) by pushing the actuating element 90 further against the spring 92. This causes the leg 106 to push the leg 102 to a straight condition and then to a subsequent curvature. This forces the circle 104 towards the abutment 108, compressing the lead between them. Nevertheless, because finger pressure is compressing the actuating element 90 onto the lead 48, the lead is gripped tightly by the actuating element and forced past the circle 104. On the return travel however, finger pressure on the actuating element 90 is less. Retraction of the lead is prevented by the friction of the circle 104 pressing the lead against the abutment 108. This is greatest when the leg 102 is again straight (which is after the start of return travel of element 90). Moreover, circle 104 is rotating in the sense to advance the lead. The actuating element 90 slides over the lead until the leg 102 of the spring has returned sufficiently towards the original curvature. After this the lead is retracted slightly during the last part of the return travel of the actuating element 90.

It will be appreciated that this arrangement exploits the fact that finger pressure on the projecting part of element 90 will be less during the upward, return travel of the actuating element than during its downward travel. Consequently during the downward travel, the lead is forced to move with the actuating element 90. On the return, however, the lead is trapped between the circle 104 and abutment 108, preventing it from being retracted so far. The lead 48 remains trapped until the actuating element has partially returned.

The circles 96, 104 can distort out if round to take up the elongation of leg 102 as it straightens.

As in FIGS. 2 and 3, it is possible to provide a second aperture 80, with a second lead 48, actuating element 90 and spring 92.

FIG. 6 is an analogous view to FIG. 4, showing an alternative form of spring. This is again moulded from polyacetal resin while the actuating element 90 again is moulded from polypropylene and is similar to that described previously. The spring 112 has a main straight portion 114 which can slide between blocks 116, 118 integral with one or other of walls 16, 34. The actuating element 90 bears on a side arm 120. A second side arm 122 bears on a block 124. A gripper shoe 126 is formed attached to the portion 114 through a narrow neck 128 and is compelled to slide parallel to the lead 48 by guides 130, 131 integral with one or other of walls 16, 34. The arm 122 urges the gripper shoe 126 against the lead 48.

If the actuating element 90 is pushed down by a small amount, it advances the lead 48 against the resilience of the spring 112 whose arm 120 is pushed down after which the straight portion 114 of the spring starts to bend. The tip of the lead can thus be made to project. The gripper shoe 126 is advanced with the lead. Provided the shoe 126 does not reach the stop surface 132, the spring 112 carries everything back to its original position when the actuating element 90 is released.

In order to index the lead, the actuating element is moved down further. The gripper shoe 126 abuts the stop surface 132 and the lead is then pushed past the shoe 126. At this stage finger pressure is making the actuating element 90 grip the lead. On release, the reduced finger pressure reduces grip on the lead. The force of the gripper shoe 126 trapping the lead against abutment 108 takes charge and for part of the return stroke the lead is unable to return with the actuating element.

FIGS. 7 and 8 show a fourth embodiment which is a variant on FIGS. 1 to 3. The case again has walls 16, 18, 34. Wall 16 carries parts 134 forming a guide for a pencil lead 48, which again is received in a guide aperture 52 aligned with the mouth of the case.

The wall 34 carries an integral spigot 136 on which is a loosely fitting ratchet wheel 138 which is exposed through an opening 140 in edge wall 20 of the case. The wall 34 also carries an integral block 142 from which extends an arm 144 which is free to flex and forms a resilient pawl for the ratchet wheel.

The wheel 138 is urged outwardly by the arm 144 so that its hub 146 presses gently on the lead 48 and holds it. The wheel can be turned by hand in the direction of arrow 148, to advance the lead by 2 mm for each ratchet tooth. It can be pressed in (arrow 150) against the arm 144 to free the lead 48.

Lead is inserted through the guide aperture 52 while the wheel 138 is pressed in. The lead is made to project, for marking, by turning the wheel by one rachet tooth, and is retracted, when desired, by pressing the wheel 138 in, and pushing the lead back manually.

A similar lead and wheel arrangement is provided in the other half of compartment 38, for this second lead to project through a guide aperture 80 at the corner of the case opposite the mouth.

A possible modification of the various embodiments above is to provide a pencil lead as marking element, and also provide a steel scribing pin which a user can insert in place of a pencil lead. Yet again a steel scribing pin could be provided as an alternative marking element at the opposite side of the case.

I claim:

1. A tape measure comprising a case having a base, an upper surface spaced therefrom and a plurality of walls extending from said base to said upper surface with a mouth permitting passage through a said wall, proximate the injunction of said wall and said base, a measuring tape which is coilable within the case and extensible from the case through said mouth, an elongate marking element located within the case, with an end portion of the marking element engaged in an aperture through the case proximate said mouth and beside said tape, an actuating element mounted within the case engaging said marking element and operable by hand to advance said marking element said actuating element comprising a pair of parts, between which the marking element extends, manual pressure on said actuating element pressing said parts thereof together so as to grip said marking element, said parts disengaging from said marking element sufficiently to permit sliding movement of said marking element between said parts when manual pressure is released from said actuating element to cause a tip thereof to project from said aperture, for marking by means of said tip, said actuating element being exposed through an opening in a said wall of the case, intermediately between said base and said upper surface of the case, whereby manual operation to advance the marking element is a manual movement alongside the case.

2. A tape measure according to claim 1 wherein said actuating element permits retraction of the marking element such that the tip thereof withdraws into said aperture.

3. A tape measure according to claim 1 wherein said actuating element is operable against resilient bias to advance said marking element, and said resilient bias urges the actuating element to retract the marking element such that the tip thereof withdraws into said aperture.

4. A tape measure according to claim 4 wherein said actuating element is operable through a first travel to effect a temporary advance of said marking element, reversible by said resilient bias causing said actuating element to retract the marking element, and a further travel to cause a greater advance of the marking element than is reversed by said resilient bias causing retraction of the marking element.

5. A tape measure according to claim 5 further comprising a clamp for pressing on the marking element, operation of said actuating element during the further travel thereof urges the clamp against said marking element, continued pressure of the clamp on the marking element during return of the actuating element serving to oppose retraction of the marking element by the actuating element.

6. A tape measure according to claim 1 wherein said actuating element operates through a travel which is restricted, so as to advance said marking element by less than 5 mm.

7. A tape measure according to claim 1 wherein an internal partition wall divides the case into a compartment for the marking element and actuating element and another compartment for the measuring tape.

8. A tape measure according to claim 1 wherein the marking element is located inside the case parallel to a said wall, of the case, with not more than the said tip projecting longitudinally past the periphery of the said wall.

9. A tape measure according to claim 1 wherein the marking element is not more than 5 mm thick.

10. A tape measure according to claim 11 wherein the marking element is a pencil lead.

11. A tape measure according to claim 1 having a second marking element, located within the case with an end portion of the second marking element at a point remote from the said mouth of the case, and an actuating element engaging the second marking element and operable to cause a tip thereof to project, for marking by means of the said tip of the second marking element.

12. A tape measure according to claim 1 wherein said actuating element comprises hinge means connecting said two parts thereof, said parts being folded together, encompassing said marking element.

13. A tape measure according to claim 1 further comprising a resiliently deformable plastic molding, said case locating said plastic molding at a position resiliently biassing said actuating element against operation to advance said marking element.

14. A tape measure according to claim 1 comprising a clamp for bearing on said marking element, said actuating element being operable to advance said marking element, and to return while said clamp bears on said marking element, thereby advancing said marking element without equivalent subsequent retracting thereof.

15. A tape measure comprising a case having a base, an upper surface spaced therefrom and a plurality of walls extending from said base to said upper surface with a mouth permitting passage through a said wall, proximate the junction of a said wall and said base, a measuring tape which is coilable within the case and extensible from the case through said mouth, an elongate marking element carried by said case at a position with an end portion of the marking element proximate said mouth and beside said tape.

an actuating element carried by said case, and operable by hand to advance said marking element incrementally from said position to cause a tip thereof to project, for marking by means of said tip, a resiliently deformable plastic molding, said case locating said plastic molding at a position resiliently biassing said actuating element against operation thereof to advance said marking element, and acting to return said actuating element, said actuating element being exposed on a said wall of the case, intermediately between said base and said upper wall of the case, whereby manual operation of the actuating element is a manual operation alongside the case against resilient opposition by said plastic molding.

16. A tape measure according to claim 15 wherein said plastic molding comprises a clamp for bearing on said marking element, said actuating element being operable to advance said marking element and to return while said clmap bears on said marking element, thereby advancing said marking element without equivalent subsequent retraction thereof.

17. A tape measure according to claim 15 wherein said actuating element is operable through a first travel to advance said marking element by an increment which is reversible by said resilient plastic molding subsequently retracting said projecting tip, and a further travel to cause a greater advance of said marking element, during which further travel the actuating element urges said clamp against said marking element, continued pressure of the clamp on the marking element during return of the actuating element serving to oppose retraction of the marking element by the actuating element.

* * * * *